(12) United States Patent
Yildiz et al.

(10) Patent No.: US 11,586,243 B2
(45) Date of Patent: Feb. 21, 2023

(54) INFORMATION HANDLING SYSTEM FLEXIBLE DISPLAY ROTATIONAL ORIENTATION MONITORING AND MANAGEMENT

(71) Applicant: Dell Products L.P., Round Rock, TX (US)

(72) Inventors: Yagiz Can Yildiz, Austin, TX (US); Christopher A. Torres, San Marcos, TX (US); Kevin M. Turchin, Cedar Park, TX (US); Gerald R. Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 722 days.

(21) Appl. No.: 16/530,519

(22) Filed: Aug. 2, 2019

(65) Prior Publication Data

US 2021/0034101 A1 Feb. 4, 2021

(51) Int. Cl.
*G06F 1/16* (2006.01)
*G06F 1/20* (2006.01)

(52) U.S. Cl.
CPC .......... *G06F 1/1616* (2013.01); *G06F 1/1652* (2013.01); *G06F 1/1681* (2013.01); *G06F 1/203* (2013.01); *G06F 2200/201* (2013.01)

(58) Field of Classification Search
CPC .. G06F 2200/201; G06F 1/203; G06F 1/1681; G06F 1/1616; G06F 1/1652
See application file for complete search history.

(56) References Cited

U.S. PATENT DOCUMENTS

| | | | |
|---|---|---|---|
| 6,122,166 A * | 9/2000 | Mochizuki | G06F 1/203 361/679.52 |
| 6,212,069 B1 * | 4/2001 | Janik | G06F 1/1637 361/679.55 |
| 6,811,491 B1 | 11/2004 | Levenberg et al. | |
| 7,281,338 B2 | 10/2007 | Ziegmann et al. | |
| 8,228,667 B2 | 7/2012 | Mao | |
| 8,249,452 B2 | 8/2012 | Biegert et al. | |
| 8,419,541 B2 | 4/2013 | Mao | |
| 9,539,507 B2 | 1/2017 | Schoenith et al. | |
| 9,818,961 B2 | 11/2017 | Hiroki et al. | |
| 9,857,833 B2 | 1/2018 | Morrison et al. | |

(Continued)

FOREIGN PATENT DOCUMENTS

| CN | 108079576 A | 5/2018 |
|---|---|---|
| CN | 110007784 A | 7/2019 |

(Continued)

OTHER PUBLICATIONS

Nintendo, "Switch," downloaded from https://www.nintendo.com/switch/system/, Feb. 26, 2020, 5 pages.

*Primary Examiner* — Abbas I Abdulselam
(74) *Attorney, Agent, or Firm* — Zagorin Cave LLP; Robert W. Holland

(57) ABSTRACT

A portable information handling system folds a flexible display over a hinge and selectively engages a brake that restricts hinge movement if a predetermined condition exists, such as a predetermined thermal state associate with potential damage to the flexible display. Heating and cooling elements increase or decrease the flexible display thermal state to fall within a constraint that supports folding and releases the hinge brake.

17 Claims, 14 Drawing Sheets

(56) References Cited

U.S. PATENT DOCUMENTS

| | | |
|---|---|---|
| 9,918,395 B1 | 3/2018 | Harmon et al. |
| 10,082,839 B1 | 9/2018 | Turchin et al. |
| 10,101,772 B2 | 10/2018 | Aurongzeb et al. |
| 10,120,421 B1 | 11/2018 | Hong et al. |
| 10,231,347 B2 | 3/2019 | Seo et al. |
| 10,303,218 B2 | 5/2019 | Jones et al. |
| 10,317,934 B2 | 6/2019 | Hampton et al. |
| 10,344,510 B2 | 7/2019 | Siddiqui et al. |
| 10,345,858 B2 | 7/2019 | Han et al. |
| 10,352,354 B1 | 7/2019 | Hsu et al. |
| 10,480,227 B1 | 11/2019 | Chen et al. |
| 10,802,549 B2 | 10/2020 | Quinn et al. |
| 10,817,082 B1 | 10/2020 | Yildiz et al. |
| 2004/0235566 A1 | 11/2004 | Hussaini et al. |
| 2007/0097014 A1 | 5/2007 | Solomon et al. |
| 2008/0132286 A1* | 6/2008 | Sohn .................. H04M 1/0208 455/566 |
| 2010/0282932 A1 | 11/2010 | Ong et al. |
| 2011/0063783 A1 | 3/2011 | Shim et al. |
| 2013/0257793 A1 | 10/2013 | Zeliff et al. |
| 2014/0267078 A1 | 9/2014 | Kukulski et al. |
| 2014/0375660 A1 | 12/2014 | Tamaki |
| 2015/0062525 A1 | 3/2015 | Hirakata |
| 2015/0177789 A1 | 6/2015 | Jinbo |
| 2015/0229844 A1 | 8/2015 | Yamazaki et al. |
| 2016/0014914 A1 | 1/2016 | Stroetmann |
| 2016/0097227 A1 | 4/2016 | Hsu |
| 2016/0132074 A1* | 5/2016 | Kim ...................... G06F 1/1681 345/173 |
| 2016/0293102 A1 | 10/2016 | Chaji |
| 2017/0006725 A1 | 1/2017 | Ahn et al. |
| 2017/0061836 A1 | 3/2017 | Kim et al. |
| 2017/0108928 A1 | 4/2017 | Clements et al. |
| 2017/0272559 A1 | 9/2017 | Cavallaro |
| 2018/0059866 A1 | 3/2018 | Drake et al. |
| 2018/0074636 A1 | 3/2018 | Lee et al. |
| 2018/0088738 A1 | 3/2018 | Barsness et al. |
| 2018/0125352 A1* | 5/2018 | Schmid .................. A61B 3/032 |
| 2018/0164854 A1* | 6/2018 | Wood .................. G06F 1/1681 |
| 2018/0173407 A1 | 6/2018 | Kim et al. |
| 2018/0294427 A1 | 10/2018 | Lee |
| 2018/0324964 A1 | 11/2018 | Yoo et al. |
| 2019/0018458 A1 | 1/2019 | Turchin et al. |
| 2019/0045094 A1 | 2/2019 | Fletcher et al. |
| 2019/0114070 A1 | 4/2019 | Youn |
| 2019/0131553 A1 | 5/2019 | Park et al. |
| 2019/0163320 A1 | 5/2019 | Park et al. |
| 2019/0163343 A1 | 5/2019 | Ligameri et al. |
| 2019/0166703 A1 | 5/2019 | Kim et al. |
| 2019/0212785 A1* | 7/2019 | Choi .................. F16M 11/2021 |
| 2019/0243424 A1 | 8/2019 | Lee et al. |
| 2019/0245955 A1 | 8/2019 | Lee |
| 2019/0259351 A1 | 8/2019 | Yoon et al. |
| 2019/0274227 A1 | 9/2019 | Hsu et al. |
| 2019/0286200 A1 | 9/2019 | Ho et al. |
| 2019/0350081 A1 | 11/2019 | Park et al. |
| 2019/0350096 A1 | 11/2019 | Chao et al. |
| 2020/0117245 A1 | 4/2020 | Ou et al. |
| 2020/0166971 A1 | 5/2020 | Lee et al. |
| 2020/0196461 A1 | 6/2020 | Shin |
| 2020/0225699 A1 | 7/2020 | Yu et al. |
| 2020/0225710 A1 | 7/2020 | Pelissier et al. |
| 2020/0225711 A1 | 7/2020 | Pelissier et al. |
| 2020/0233466 A1 | 7/2020 | Sanchez et al. |
| 2020/0291702 A1 | 9/2020 | Hsu et al. |
| 2020/0319672 A1 | 10/2020 | Kim et al. |
| 2020/0329574 A1 | 10/2020 | Lee |
| 2020/0333835 A1 | 10/2020 | Wi et al. |
| 2020/0371561 A1 | 11/2020 | Lin et al. |
| 2020/0383215 A1 | 12/2020 | Kim et al. |
| 2020/0392983 A1 | 12/2020 | Chang et al. |
| 2020/0401193 A1 | 12/2020 | Hsu et al. |
| 2020/0409427 A1 | 12/2020 | Hsu |
| 2020/0409428 A1 | 12/2020 | Wang et al. |
| 2020/0409429 A1 | 12/2020 | Hsu |
| 2020/0409431 A1 | 12/2020 | Fan |
| 2020/0413557 A1 | 12/2020 | Zhang |
| 2021/0011513 A1 | 1/2021 | Watamura et al. |
| 2021/0018963 A1 | 1/2021 | Pelissier et al. |
| 2021/0026406 A1 | 1/2021 | Kim et al. |
| 2021/0034116 A1 | 2/2021 | Torres et al. |
| 2021/0034117 A1 | 2/2021 | Torres et al. |
| 2021/0149456 A1 | 5/2021 | Pelissier et al. |
| 2021/0191478 A1 | 6/2021 | Mehandjiysky et al. |
| 2021/0207414 A1 | 7/2021 | Wang |
| 2021/0311523 A1* | 10/2021 | Bai ...................... G06F 1/1626 |

FOREIGN PATENT DOCUMENTS

| | | |
|---|---|---|
| JP | 2017220185 A | 12/2017 |
| KR | 20150056066 A | 5/2015 |

* cited by examiner

FIG. 4

| THERMAL MODEL TABLE | | | | | | | | | | | | | | | | |
|---|---|---|---|---|---|---|---|---|---|---|---|---|---|---|---|
| ∘∘∘ | | | | | | | | | | | | | | | |
| 10% OPR + 50% EL + CPU 1W CHARGE OFF UNCOVERED... | | | | | | | | | | | | | | | |
| 10% OPR + 25% EL + CPU 1W CHARGE OFF UNCOVERED... | | | | | | | | | | | | | | | |
| 10% OPR + 100% EL + CPU 1W CHARGE OFF UNCOVERED... | | | | | | | | | | | | | | | |
| 10% OPR + 75% EL + CPU 1W CHARGE ON UNCOVERED... | | | | | | | | | | | | | | | |
| 10% OPR + 50% EL + CPU 5W CHARGE OFF UNCOVERED... | | | | | | | | | | | | | | | |
| 10% OPR + 50% EL + CPU 1W CHARGE OFF UNCOVERED... | | | | | | | | | | | | | | | |
| 10% OPR + 25% EL + CPU 1W CHARGE ON UNCOVERED... | | | | | | | | | | | | | | | |
| 10% OPR + 25% EL + CPU 5W CHARGE OFF UNCOVERED... | | | | | | | | | | | | | | | |
| 10% OPR + 25% EL + CPU 3W CHARGE OFF COVERED... | | | | | | | | | | | | | | | |
| 10% OPR + 25% EL + CPU 1W CHARGE OFF COVERED... | | | | | | | | | | | | | | | |
| 10% OPR + 25% EL + CPU 1W CHARGE OFF UNCOVERED... | TEMPSKIN + TIMESATURATE | | | | | | | | | | | | | | |
| ZONE | 1 | 2 | 3 | 4 | 5 | 6 | 7 | 8 | 9 | 10 | 11 | 12 | 13 | 14 | 15 |

FIG. 5

PANEL CHARACTERIZATION TABLE

| ZONE # | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| TON - hrs | 3000 | 3257 | 4098 | 4001 | 4078 | 4506 | 4836 | 4791 | 4803 | 4644 | 2979 | 2910 | 2500 | 2500 | 2573 |
| AVERAGE PIXEL BRIGHTNESS | | | | | | | | | | | | | | | |
| AVERAGE OPERATING TEMPERATURE | | | | | 50 | | | | | | | | | | |
| TPEN - mins | 4 | | | | 5 | 47 | 60 | 62 | 63 | | 6 | | | | 3 |
| AVERAGE PEN PRESSURE DATA | | | | | | | | | | | | | | | |
| GAP UNDERNEATH THE ZONE? | YES | | YES | | YES | | | | | | | | YES | | |
| WAVINESS AMOUNT (um) | | | | | | | | 60 | | | | | | | |
| BENDING REGION? | NO | NO | YES | NO | NO | NO | NO | YES | NO | NO | NO | NO | YES | | |
| NUMBER OF BENDS | N/A | N/A | 10 | N/A | N/A | N/A | N/A | 10 | N/A | N/A | N/A | N/A | 10 | | |
| TOTAL DURATION OF BENDS (mins) | N/A | N/A | 500 | N/A | N/A | N/A | N/A | 500 | N/A | N/A | N/A | N/A | 50 | | |
| TIME SINCE LAST BEND (mins) | N/A | N/A | 50 | N/A | N/A | N/A | N/A | 50 | N/A | N/A | N/A | N/A | 50 | | |
| DAMAGED OR IN CRITICAL CONDITION | | | | | | | | | YES | | | | | | |
| PMAX | | | | | | | | | | | | | | | |
| TOUCH INPUT SENSITIVE | | | | | | YES | | | | | | | | | |
| COLOR COMPENSATION NEEDED | | | | | | YES | YES | YES | YES | | | | | | |

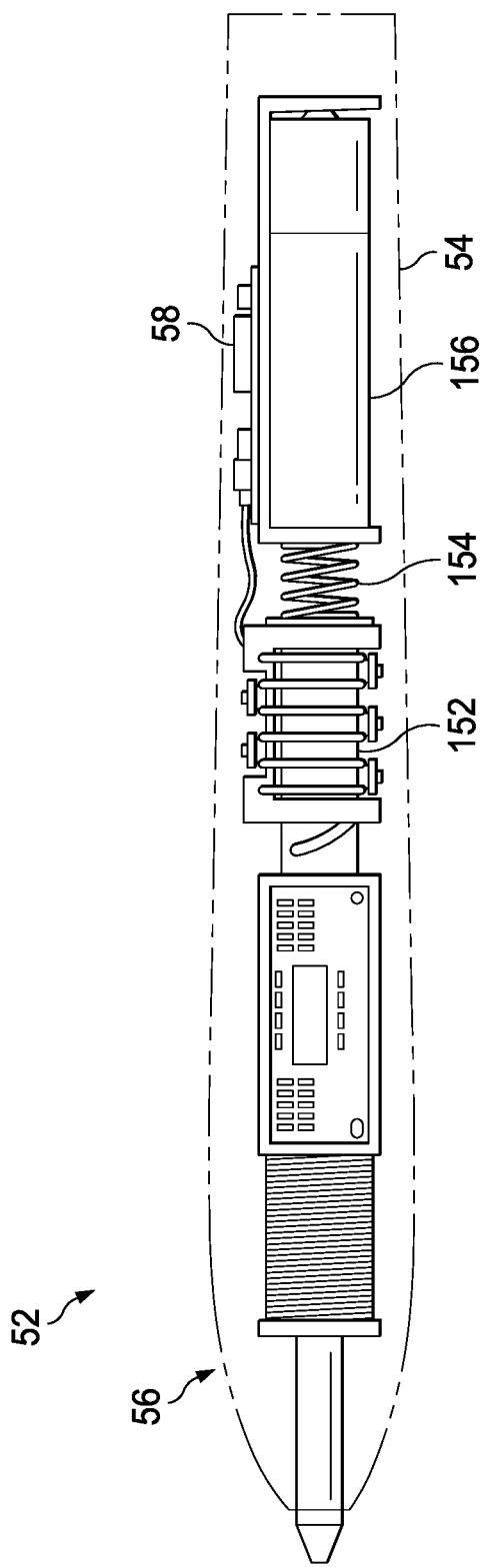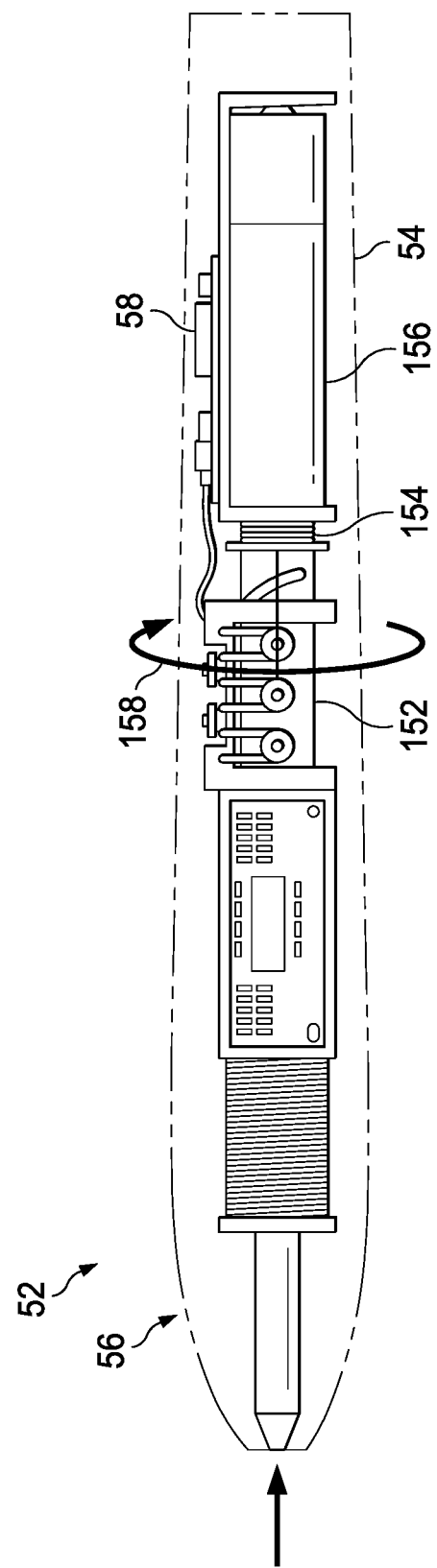

INFORMATION HANDLING SYSTEM FLEXIBLE DISPLAY ROTATIONAL ORIENTATION MONITORING AND MANAGEMENT

CROSS-REFERENCE TO RELATED APPLICATION(S)

U.S. patent application Ser. No. 16/530,546, filed Aug. 2, 2019, now U.S. Pat. No. 11,024,224, issued Jun. 1, 2021, entitled "Information Handling System Flexible Display Operating Condition Monitoring and Management" by inventors Yagiz Can Yildiz, Christopher A. Torres, Kevin M. Turchin, and Gerald R. Pelissier, describes exemplary methods and systems and is incorporated by reference in its entirety.

U.S. patent application Ser. No. 16/530,578, filed Aug. 2, 2019, now U.S. Pat. No. 10,817,082, issued Oct. 27, 2020, entitled "Information Handling System Flexible Display Smart Stylus" by inventors Yagiz Can Yildiz, Christopher A. Tones, Kevin M. Turchin, Gerald R. Pelissier, and Rex W. Bryant, describes exemplary methods and systems and is incorporated by reference in its entirety.

BACKGROUND OF THE INVENTION

Field of the Invention

The present invention relates in general to the field of portable information handling systems, and more particularly to information handling system flexible display rotational orientation monitoring and management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that rotationally couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Recently, market interest has increased for highly mobile information handling systems that have increased display surfaces to present information as visual images. To improve mobility and display viewing areas, a second display is integrated in the housing instead of a keyboard. In such systems, rotation to the clamshell configuration allows the user to type at a virtual keyboard presented on a horizontally-oriented display while viewing information at a vertically-oriented display. By further rotating the housing to a tablet configuration, both displays are available to present visual information. In low Z-height systems having minimal hinge spacing between the housing portions, only a small space exists between the displays to disrupt viewing visual images across both displays.

Generally, dual-display portable information handling systems share many of the problems faced by conventional convertible systems. One problem that tends to arise is that processing components dissipate power as heat that has to be rejected from portable housings. Often in low Z-height systems, thermal management is performed with passive transfer rather than active transfer, such as a cooling fan that rejects thermal energy with a cooling airflow. Passive thermal rejection tends to involve heat pipes and other thermal transfer conduits that reject at least some thermal energy across the outer skin of the housing. In addition, passive management may control the amount of thermal energy generated by processing components to reduce internal and skin temperatures. To aid in thermal management, INTEL provides a Dynamic Platform Thermal Framework (DPTF) that manages processing component operation to maintain thermal constraints. A recent update to DPTF adjusts processing component operation based upon system orientation, which tends to impact how well thermal energy dissipates from the housing surface.

Another problem that tends to arise with distributing displays between two separate housing portions tends to break up presentation of visual information. Although a single visual image may stretch across both displays, the break formed in the middle of the visual image tends to disrupt end user enjoyment and consumption of presented content. For instance, a dual display information handling system opened to a tablet configuration can present a movie across both displays, however, the content is disrupted through a central portion.

One solution that helps present visual information across rotationally coupled housing portions is the use of a flexible display that folds across the housing portions. Specifically, organic light emitting diode (OLED) display films present visual information by applying current to red, green and blue organic material disposed in each of plural pixels. When an OLED film is disposed over a plastic substrate (POLED), the resulting flexible display film can integrate over a hinge to fold about the hinge when the housing portions are rotated from closed to open positions. Thus, in an open position, the display surface spreads across both housing portions to allow end user viewing of content without a break at the hinge fold location.

Although POLED displays fold across a hinge, the material tends to be sensitive to environmental conditions and folding stresses, such as from compressive and tensile forces translated by movement of the housing portions and hinge. For instance, in both high and low temperature extremes, POLED folding may result in damage, such as warpage, that distorts visual images presented at the display. Further, the response of a POLED to folding forces may vary substantially based upon operational conditions to which the POLED is subjected. For instance, a POLED display that remains folded for an extended amount of time tends to develop a memory of the folded condition that resists unfolding, which can lead to damage of the POLED at unfolding.

Generally, the fold area of a flexible display, such as the area over top of a hinge, is supported by a flexible support that raises into position under the flexible display in the tablet configuration and yields as the display folds. When the flexible display is flat, failure to provide sufficient support underneath can result in damage to the display from end user presses, such as with a finger or stylus input. However, any support provided under the display typically has to move out of the way of the display as the display folds to avoid exerting compressive or tensile stress on the display. The amount of pressure that a display can withstand in its folding portion tends to vary based upon operating conditions.

SUMMARY OF THE INVENTION

Therefore, a need has arisen for a system and method which monitors and manages flexible display operating conditions.

In accordance with the present invention, a system and method are provided which substantially reduce the disadvantages and problems associated with previous methods and systems for monitoring and managing flexible display operating conditions. A display manager monitors and stores operating conditions at a display, applies the stored operating conditions to determine display operating constraints, and applies the current operating conditions against the operating constraints to adapt display operations, such a display fold orientation or touch pressures at the display.

More specifically, an information handling system processes information with processing components disposed in a housing, such as a housing having separate portions rotationally coupled by a hinge assembly. A flexible display is disposed over the housing portions and hinge to provide a tablet configuration with the housing portions in an open position and to fold over the hinge when the housing portions rotate to the closed position. A display manager stored in non-transitory memory and executed on a processor of the information handling system monitors plural sensors that sense display operating conditions and store the sensed operating conditions to model display operating constraints associated with limits enforced for display operations. For instance, the plural sensors may include temperature sensors that detect a thermal state of the display, rotation sensors that detect a rotational orientation of the housing portions, and pressure sensors that detect pressures associated with touches at the display. Display operating conditions may be adapted based upon a temperature constraint by heating or cooling the display or locking the display in a current position, such as a folded or flat position, until the temperature constraint is alleviated. As another example, a pressure condition may be adapted based upon a detected stylus usage by adjusting the writing tip size used by the stylus or providing the end user with an audible, haptic or visual warning.

The present invention provides a number of important technical advantages. One example of an important technical advantage is that an information handling system having a folding display has improved life and robustness by monitoring display operating conditions over time and applying the operating conditions to determine operating constraints relative to sensed conditions, such as temperature, fold angle and touch inputs. For instance, a hinge brake interfaced with a hinge restricts housing portion rotation that folds or unfolds a flexible display when the flexible display temperature exceeds a threshold temperature range, indicating that damage may occur to the flexible display if it folds or unfolds. As another example, active heating or cooling of the flexible display to achieve a thermal state within the threshold temperature range to reduce any impact on an end user, such as by maintaining the temperature range at all times or rapidly achieving the temperature range when an end user attempts to adjust the housing portion rotational orientation. In one example embodiment, flexible display thermal state is adapted by altering operations of processing components of the information handling system, such as by change display brightness, processor operating speed, or executing non-productive code that generates thermal energy.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 depicts an example thermal model table that lists thermal conditions expected for display film operating conditions based upon the plural regions;

FIG. 5 depicts a panel characterization table having examples of stored information gathered from sensors that monitor the flexible display;

FIGS. 10A, 10B, 10C and 10D depict side cutaway views of a stylus having automated interactions with a flexible display film;

DETAILED DESCRIPTION

An information handling system flexible display operating conditions are monitored to manage flexible display operations within operating constraints that are adjusted for flexible display usage over time. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
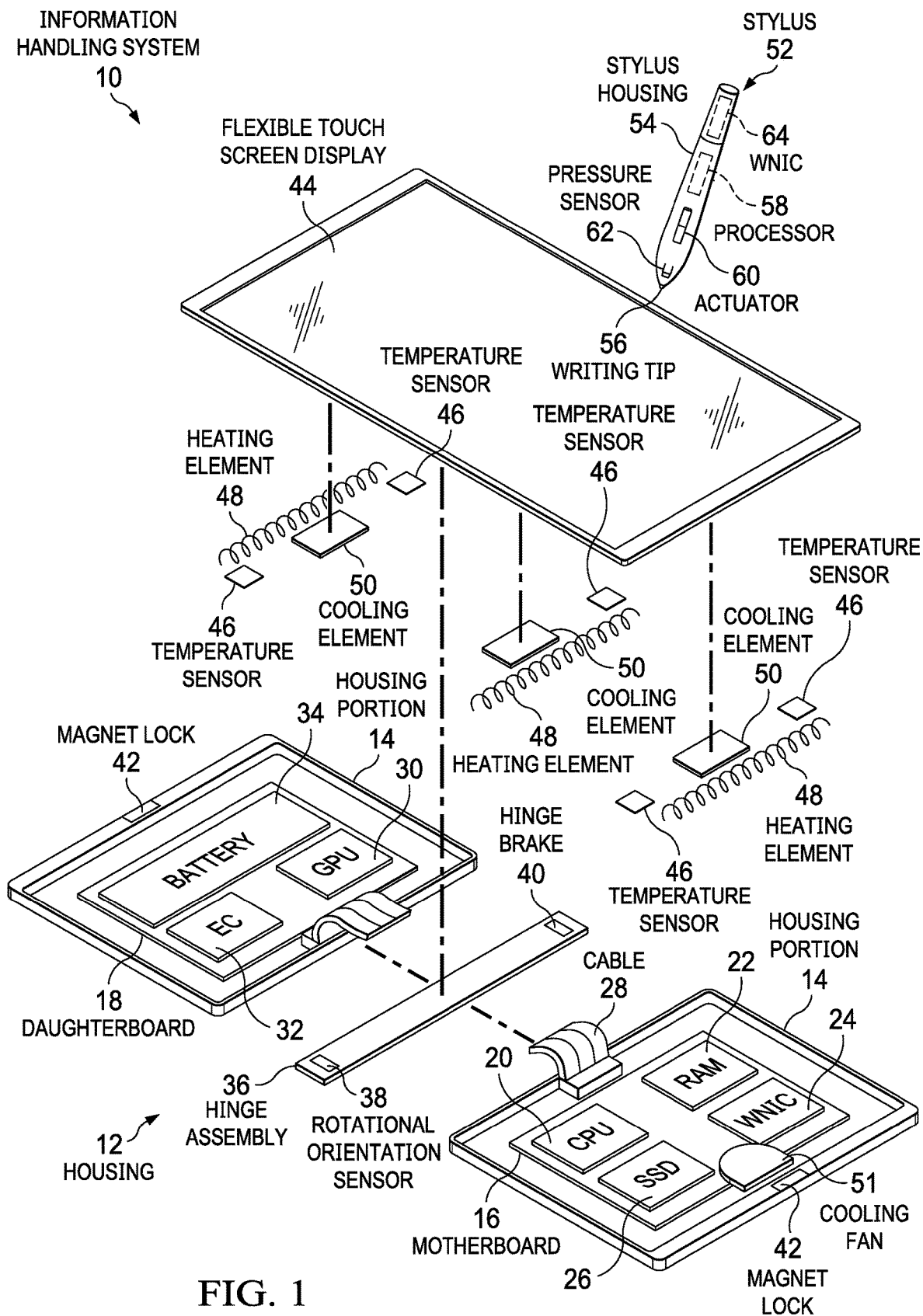
FIG. 1 depicts an exploded view of an information handling system having flexible display monitoring and management.

Referring now to FIG. 1, an exploded view depicts an information handling system 10 having flexible display monitoring and management. Information handling system 10 is built into a housing 12 having opposing housing portions 14 rotationally coupled by a hinge assembly 36. In the example embodiment, one housing portion 14 contains a motherboard 16 and the opposing housing portion contains a daughterboard 18, which interface across hinge assembly 36 through a flexible cable 28. Motherboard 16 includes wirelines that interface processing components mounted to its surface. A central processing unit (CPU) 20 executes instructions that process information in cooperation with a random access memory (RAM) 22 that stores the instructions and information. A wireless network interface card (WNIC) includes wireless communication components that support communication of information by wireless signals, such as wireless local area network (WLAN), wireless wide area network (WWAN) and wireless personal area network (WPAN) communications. A solid state drive (SSD) 26 provides non-transitory memory for persistent storage of information, such as of an operating system and applications. Daughterboard 18 includes wirelines that interface other processing components, such as a graphics processing unit (GPU) 30 and embedded controller 32. In the example embodiment, embedded controller 32 manages application of power to the processing components from an integrated battery 34.

In operation, information handling system 10 applies power managed by embedded controller 32 to initiate a boot process to reach an operational state. For instance, at a press of a power button or other power up indication, embedded controller 32 draws power from battery 34 and executes pre-boot code to power up CPU 20 and RAM 22. Under management of the preboot code, a basic input/output system (BIOS) or other management code initiates retrieval of an operating system from SSD 26 to an active state for operational control of the processing components. CPU 20 provides visual information defined by the operating system to GPU 30, which processes the visual information into pixel values that define visual images for presentation at a flexible touchscreen display 44. Flexible touchscreen display 44 detects touches as inputs that are communicated through embedded controller 32 to CPU 20. In various embodiments, various combinations of processing components may be used and distributed in housing 12 to provide an information handling system having a desired capability and size.

Flexible touchscreen display 44 is, for example, a plastic organic light emitting diode (POLED) display film that is supported over top of housing 12 with an integrated flexible plastic substrate. In a planar tablet position, such as depicted in the example embodiment, flexible touchscreen display 44 lays across both housing portions 14 in one plane acting as a tablet with a contiguous viewing area. By folding housing portions 14 at hinge assembly 36, flexible touchscreen display 44 folds at a central portion to allow a transition from the tablet position to a clamshell position, such as at approximately ninety degrees of rotation, and a closed position having opposing housing portions in close proximity to each other, such as at approximately 180 degrees of rotation. Although POLED material is designed to fold with hinge assembly 36, the impact that a fold has on the longevity of the POLED material may vary greatly based upon operating conditions at flexible touchscreen display 44, such as the temperature, compressive or tensile stresses present, external pressure pressed against the display film and historical usage patterns. Folding of flexible touchscreen display 44 in operating conditions outside of operating constraints can cause damage to the POLED display film.

In order to characterize operating constraints, code executing on information handling system 10, such as embedded code stored as firmware that executes on embedded controller 32, BIOS stored in SSD 26 and/or a driver executing with an operating system execution on CPU 20, monitors operating conditions over time and applies the operating conditions to model operating constraints of flexible touchscreen display 44. For example, a rotational orientation sensor 38 detects rotational orientation of housing portions 14 to track an amount of rotation, time in a rotational position and a number of rotations. Rotational orientation sensor 38 may measure hinge position, such as by counting gear motion and position, may measure relative gravitational positions of housing portions 14, such as with accelerometer gyroscopes in each housing portion 14, or may use other relative positional measurements of housing portions 14. As another example, temperature sensors 46 distributed through housing 12 and at flexible touchscreen display 44 determine a thermal state of the POLED material, which tends to suffer damage if the plastic substrate has an excessive or too low temperature. Thermal conditions at flexible touchscreen display 44 may be measured directly or estimated by other nearby temperature readings. In addition, thermal conditions at flexible touchscreen display 44 may be estimated with virtual temperature sensors, such as by estimating thermal conditions from power dissipated by nearby processing components.

Another example of an operating condition sensor is found through the interaction of a stylus 52 with a touch detection sensor integrated in flexible touchscreen display 44. Stylus 52 has a pen-shaped housing 54 that terminates at one end with a writing tip 56 having a tip designed to touch at a precise location of flexible touchscreen display 44. A processor 58 interfaces with the tip to provide selection of the tip type, such as the size of the tip, and an active capacitance provided to the tip for improved touch detection. An actuator 60 interfaces with processor 58 and writing tip 56 to change the size of the writing tip and other configuration settings. A pressure sensor 62 interfaces with writing tip 56 and processor 58 to detect an amount of pressure acting against writing tip 56. A WNIC 64, such as a Bluetooth transceiver, interfaces with processor 58 to report the pressure sensor readings from stylus 52 to information handling system 10's WNIC 24. Monitoring pressure at touches detected by the touch detection of flexible touchscreen display 44 supports tracking of wear related to pressure placed against the POLED material. Similar monitoring of finger presses may be performed by estimating finger pressure, such as by the size of the press, or measuring pressure with the touchscreen touch detection circuitry.

Based upon historical sensor data monitoring and a model of expected POLED material responses, operating constraints are determined for currently sensed conditions and applied to modify operations at information handling system 10 with respect to flexible touchscreen display 44. For example, when current operating conditions indicate that folding or unfolding flexible touchscreen display 44 could result in damage, a hinge brake 40 restricts movement of hinge assembly 36 to protect against the damage. For example, hinge brake 40 may bind gears of hinge assembly 36 to prevent rotation or increase friction of a torque plate to make rotation more difficult and/or slow. Similarly, magnet locks 42 on opposing housing portions 14 may magnetically-attract the housing portions to each other to prevent movement of housing portions 14 towards an open position. These magnet locks 42 may also be used to force some separation between the housing portions 14 if housing 12 is in a closed position for an excessive time so that the folding radius of flexible touchscreen display 44 does not compress to too small of a size.

In one example embodiment, hinge brake 40 prevents rotation about hinge assembly 36 due to a sensed thermal condition having too low of a temperature. At low thermal states, POLED material may break if folding is attempted, such as if information handling system 10 is closed in an off state for an extended time in a low ambient temperature condition. Embedded controller 32 interfaces with hinge brake 40 to have an "on" interrupt sent from hinge brake 40 when an attempt to open the housing portions 14 is prevented by hinge brake 40. Upon powering up and detecting a locked hinge assembly 36, embedded controller 32 may initiate active warming of the POLED material so that hinge brake 40 releases to allow opening of housing portions 14. Warming may be performed by applying power to processing components, such as CPU 20 and GPU 30 near the folding region so that dissipation of power by the processing components releases thermal energy. As another alternative, a set of heating elements 48 may be activated for the direct purpose of creating heat at the POLED material. In some instances, embedded controller 32 may read temperature sensors 46 to determine where in POLED material the thermal state is too cold and selectively apply only some heating elements 48 to those areas. If the POLED material thermal state is too hot, cooling elements 50 may instead be activated to reduce the thermal state within housing 12. For instance, small piezo cooling fans may generated cooling airflow at flexible touchscreen display 44 while a system cooling fan 51 draws cooling airflow into housing 12. In one example embodiment, embedded controller 32 may remain active when information handling system 10 is in an off state so that the OLED material is automatically kept at a thermal state at which folding and unfolding is supported. Such constant monitoring for any extended time period will typically require external power interfaced with information handling system 10.

Figure 2:
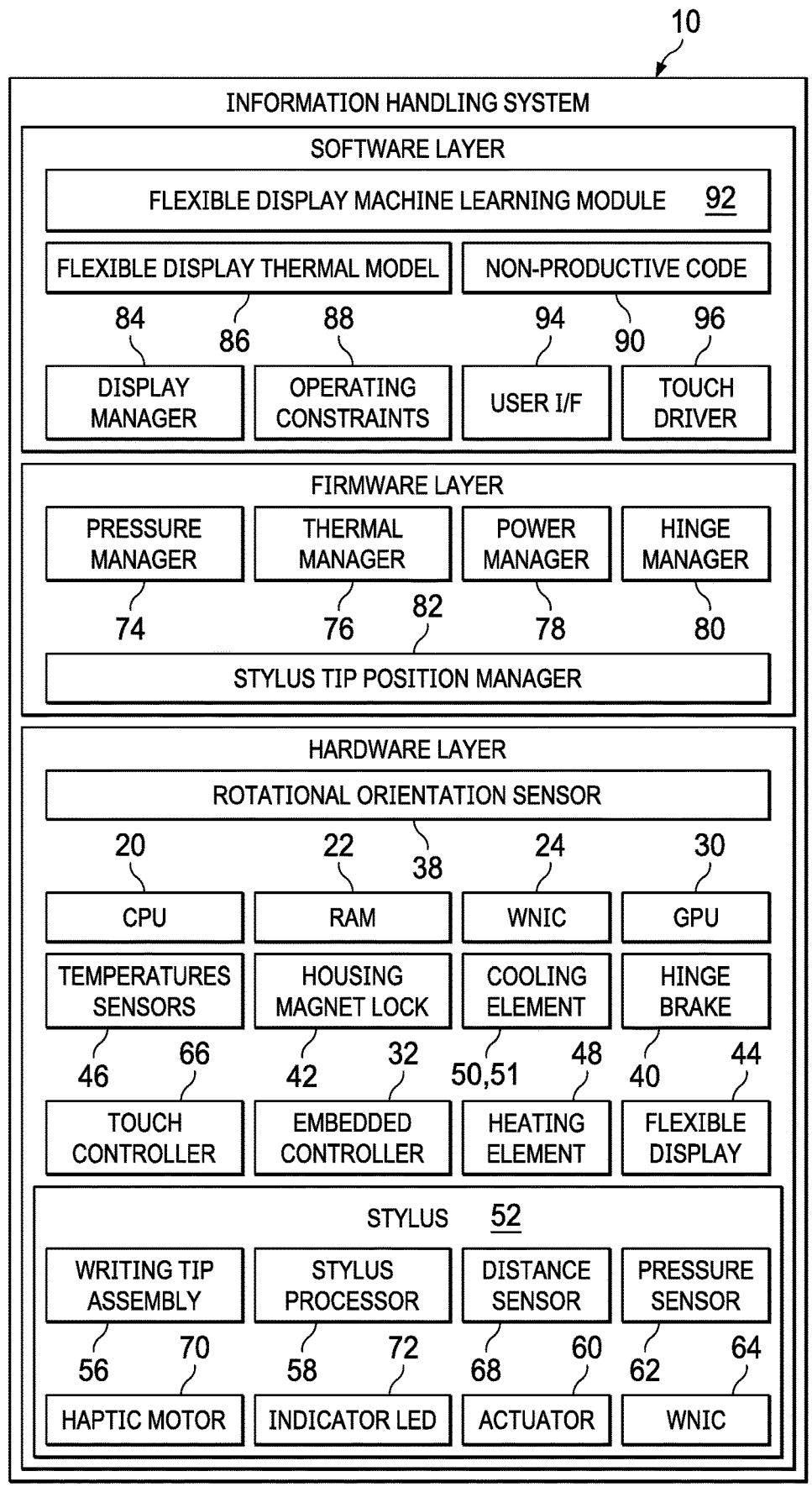
FIG. 2 depicts a block diagram of hardware, firmware and software layers of an information handling system having flexible display monitoring and management.

Referring now to FIG. 2, a block diagram depicts hardware, firmware and software layers of an information handling system 10 having flexible display monitoring and management. The example embodiment hardware layer includes processing components and other hardware components described above with respect to FIG. 1, such as CPU 20 that executes instructions to process information, RAM 22 that stores the instructions and information, GPU 30 that processes visual information to define visual information for presentation on flexible touchscreen display 44 and embedded controller 32 that manages power and thermal conditions at the processing components. A touch controller 66 interfaces with flexible touchscreen display 44 to scan for touch inputs, such as with capacitive touch detection. WNIC 24 provides communication through wireless signals, such as through WiFi and Bluetooth. As describe above, temperature sensors 46 and rotational orientation sensor 38 detect operating conditions at information handling system 10 while heating elements 48, such as resistive heaters, cooling elements 50 and 51, such as air moving devices, hinge brake 40 and housing magnet lock 42 adapt information handling system 10 operations to achieve desired operating constraints. In addition to the hardware elements within information handling system 10, stylus 52 includes its processor 58 that executes instructions, typically embedded code, to provide additional monitoring and modifications related to flexible touchscreen display 44. As described above, writing tip 56 includes an assembly of contact points having different levels of precision selected by processor 58 through actuator 60. In addition to pressure sensor 62, stylus 52 includes a distance sensor 68 that detects a distance to a writing surface, such as an infrared time of flight sensor. WNIC 64 communicates pressure sensor and distance sensor output to information handling system 10 with wireless signals. A haptic motor 70 and LED indicator 72 provide feedback to an end user of stylus 52, such as if POLED film material restricts stylus interactions with flexible touchscreen display 44. For instance, if a pressure operating constraint exists at flexible touchscreen display 44, such as due to an excess thermal state, wireless communication to stylus 52 actuates a larger writing tip 56 and issues a warning to the end user with haptic feedback and an LED indication when pressure becomes excessive.

The firmware layer of information handling system 10 receives operating condition sensed data from various sensors, such as temperature sensors 46, rotational orientation sensor 38 and touch controller 66, and applies the operating conditions to manage operation of flexible touchscreen display 44. Specifically, the POLED material of the flexible display film of flexible touchscreen display 44 is managed by local firmware to adapt to sensed operating conditions; in addition, the firmware layer communicates sensed conditions to a software layer that provides more computation-intense analysis and adaptive operations with instructions back to the firmware layer. In various embodiments, instructions to perform the monitoring of operational conditions and modifications to maintain operational constraints may be divided between firmware, such as embedded code stored in flash memory and executed on embedded controller 32 or other processing components, and software, such as in the operating system with drivers for various processing components. In the example embodiment, the firmware layer includes a pressure manager 74 that receives pressure values from pressure sensor 62 and, if available, from touch controller 66, and applies the pressure values with associated touch positions to detect conditions that violate determined pressure constraints. A thermal manager 76 executes to monitor thermal conditions sensed by temperature sensors 46 and apply heat from heating elements 48 or cooling from cooling elements 50 and 51 based on a comparison of sensed thermal conditions with thermal constraints. For instance, POLED material film thermal management is provided as an extension of system thermal management typically found in conventional information handling systems to keep other processing components within thermal constraints. A power manager 78 monitors power consumption of processing components, which provides feedback of expected thermal conditions. For instance, power manager 78 monitors flexible touchscreen display 44 brightness, on-pixel-ratios (OPR), and power draw to estimate thermal conditions of POLED material based upon power dissipation. A hinge manager 80 interfaces with rotational orientation sensor 38 to detect the hinge position and with hinge brake 40 and housing magnet lock 42 to adjust hinge motion if an operating constraint is violated by hinge motion. A stylus tip position manager 82 monitors pressure constraints to adjust the stylus position if a touched portion of flexible touchscreen display 44 has a pressure constraint that may be violated by a stylus touch.

The software layer, through access to operating system functions and processing capabilities of CPU 20, provides higher level analysis of operating conditions, including on a historical basis, to determine operating condition constraints. A display manager 84 executes on CPU 20 to receive sensed operating conditions from the firmware layer and store the sensed operating conditions for application by a flexible display thermal model 86. Flexible display thermal model 86 applies historical sensed operating conditions against known POLED material characteristics to determine operating constraints 88, which define limits of sensed conditions associated with risk to damage of the POLED material. Display manager 84 provides the operating constraints 88 to the firmware layer where rapid comparisons of sensed conditions against the operating constraints can be performed to initiate adaptive operations as operating constraint thresholds are met. In addition, the software layer includes non-productive code 90, such as an unconstrained or infinite logic loop, that executes on processing components to increase thermal energy dissipation at the processing components. Non-productive code 90 may include portions that operate on CPU 20, GPU 30, embedded controller 32 and other processing components. A flexible display machine learning module 92 performs more in depth analysis based upon actual sensed operating conditions, such as by accessing artificial intelligence and network-based resources. A user interface 94 provides an end user with access to display manager 84 to adjust operating system constraints and override automated adaptive correction for achieving end user desired operating conditions. In the example embodiment, touch driver 96 executes within the operating system to provide touch information as sensed from touch controller 66 to display manager 84. As described above, the touch information may include finger touches made at flexible touchscreen display 44.

Figure 3:
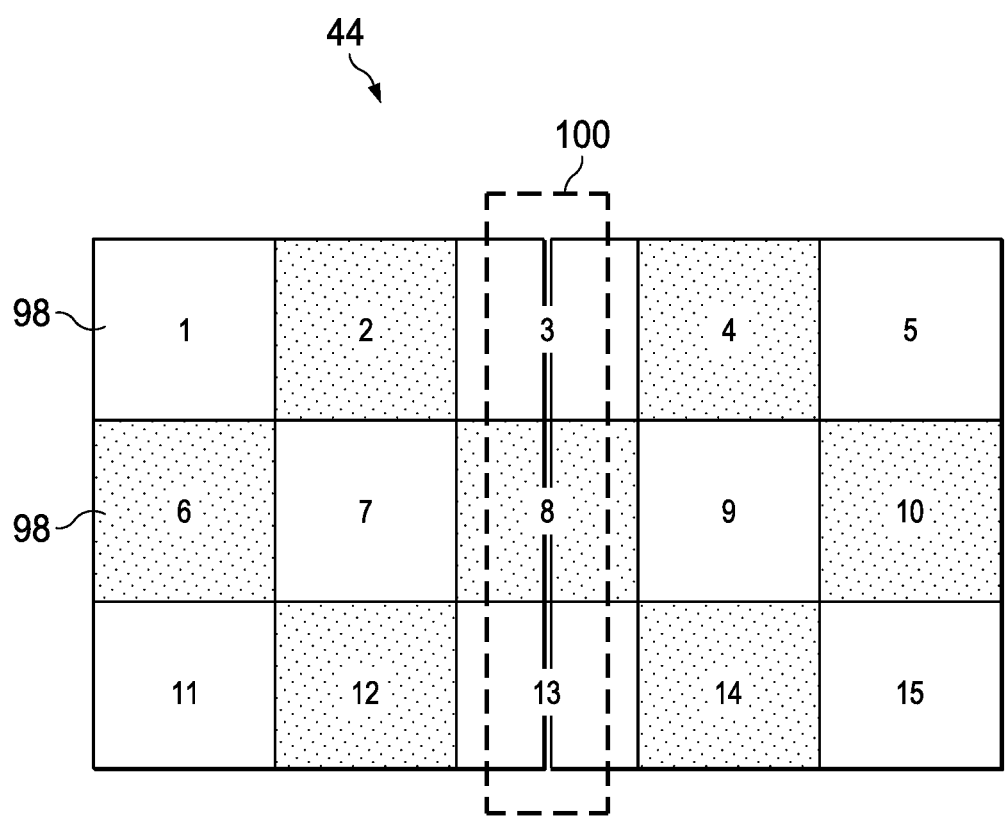
FIG. 3 depicts a flexible touchscreen display divided up into fifteen regions that are each monitored and tracked separately for detected operating conditions.

To illustrate operating system monitoring and management by the hardware, software and firmware layers of FIG. 2, some examples are provided that show tracked operating conditions and panel characteristics. Referring now to FIG. 3, a flexible touchscreen display 44 is depicted divided up into fifteen regions 98 that each monitored and tracked separately for detected operating conditions. A folding region 100 located over the hinge assembly is of particular interest since this region experiences most of the stresses associated with folding of the POLED material. Further, an airgap typically exists under folding region 100 while the other regions 98 that do not fold have a solid support that helps to resist touch pressure and decreases the effect of touches over time on the durability of the POLED material. In monitoring POLED material degradation and in determining operating constraints, such as maximum touch pressures, the amount of fold of the POLED material in folding region 100 is a factor that is considered. Referring now to FIG. 4, an example thermal model table is depicted that lists thermal conditions expected for display film operating conditions based upon the plural regions. In the example embodiment, for each of plural regions an expected thermal condition, such as skin temperature and time until saturation, is modeled based upon operating conditions of the flexible display, such as the OPR, housing configuration, CPU power dissipation and charge state. Referring now to FIG. 5, a panel characterization table depicts examples of stored information gathered from sensors that monitor the flexible display. In the example embodiment, for each of plural zones 98 of flexible touchscreen display, operating conditions are stored that reflect actual usage of the flexible display POLED material film. For example, the operating conditions include pressure applied to the display film, brightness, temperatures, number of fold incidences, stylus (pen) interactions, time in a folded or planar state, etc. . . . . . In one embodiment, current color compensation is tracked for each separate region. OLED films periodically perform a color compensation determination for each pixel by passing a signal through each pixel and measuring the response across the pixel. Current color compensation tends to be a time consuming process that is performed across an entire display area. In the example embodiment, the impact on an end user may be reduced by performing current color compensation in just one region so that the process is performed gradually over a series of operations, such as one zone per system power up. Further, since color compensation will impact thermal conditions output at a display film, more accurate thermal modeling may be performed at a fold region by performing color compensation in the fold region more often than in other regions.

Considering FIGS. 1-5, some examples of POLED material thermal optimization and degradation modification of operating constraints will help illustrate improvements provided by the present disclosure with respect to foldable display film integration into an information handling system. The construction of a foldable display with POLED material presents difficulty with thermal management and material burn in due to difficult heat transfer properties of plastic and its limited overall heat dissipation. Thermal management is enhanced to support dynamic throttling or increased use of a flexible display and other subsystems to optimize POLED thermal state with balanced skin temperature across a display film by accurately characterizing POLED thermal characteristics within an information handling system. As described above, firmware and software elements collect necessary data to adapt an initial calibration model so that various settings in different subsystems including the flexible display film adapt based upon usage mode. As described above, in one example embodiment, the flexible display film is divided into plural regions to track POLED material surface temperatures with thermocouples so that the temperatures are stored over time with related usage data, such as OPR, screen brightness levels, utilization rate of subsystems, physical cover of the display (such as an arm placed over top), in different ambient temperatures and device orientations. Based upon this historical data, thermal characteristics of the flexible display film is modeled, such as within a DPTF system, and leveraged so that the thermal effects of changes to operating conditions can be predicted and applied to maintain the flexible display film within thermal constraints.

Once a thermal model is developed for the flexible display film, the thermal model is applied to determine how operating conditions may be modified to achieve POLED material thermal conditions within defined constraints. For example, if skin temperatures become excessively high or low, or are expected to do so, then the operating conditions are sensed and, for each monitored display zone, modified to achieve thermal constraints. For instance, display brightness may be adjusted in each zone, subsystems under particular display zones may operate on an accelerated or throttled basis to adjust their thermal profile. As another example, active heating and cooling elements may adjust flexible display film thermal conditions at each zone by creating or removing thermal energy. In one example embodiment, a maximum difference in temperatures between display zones is set, such as based upon device position, device orientation, processing component workload, user selected configurations, selection of display dark or light mode, and other operating conditions. If the threshold for difference in temperature is detected, operating conditions are changed to bring the difference in temperatures between zones within the threshold. For instance, content may be moved based upon the thermal energy associated with presentation of the content, subsystems may adjust their power draw, brightness may be adjusted between the zones or other adaptations may be performed to bring the hottest and coldest zones to within the thermal constraint. In one embodiment, power draw by components and OPR in each zone may be used to predict and/or detect hotspots on the display film. Operating condition data may be collected in fine increments and increased detail from time to time so that OLED material characteristics models may be updated by machine learning algorithms for improved thermal condition control. In various embodiments, priorities for adapting operating conditions may vary based upon content presented at the display, such as a video playback, which calls for use of the entire display surface, versus a desktop, which offers flexibility about the location of presentation of visual images.

Over time and system use, POLED material characteristics will change, such as due to exposure to raised or lowered temperatures and folding of the plastic substrate. The present disclosure tracks operational conditions over time to predict and/or detect POLED material degradation so that operating constraints may be set at usage-adjusted values that prolong POLED material useful life. Once POLED material degradation is characterized, it may then be further applied to optimize usage of a stylus or finger touch interaction, placement of a user interface, panel color compensation detection and execution timeframe, and display film diagnostics. With respect to characterizing POLED material degradation related to thermal conditions, three examples of operating conditions are illustrated as tracked in each of the plural zones. One example is the total pixel on time as tracked by the graphics processor and its operating system driver. Another example is the average pixel brightness level, again as tracked by the graphics processor and its driver. A third example is the average operating temperature for each of the plural zones. Operating temperature is also tracked with respect to differentials between the zones where temperature differentials may have additional degradation effects over the effect of temperature itself. In addition, thermal characteristics tracking has a further modification effect for the plural zones located within a folding region or a region where there is no substantial support behind the flexible display film.

With respect to POLED material degradation related to folding of the display film, a number of different operating conditions may be tracked. One example is tracking touches at the flexible display film by a stylus as well as by human touches. For instance, touches are tracked by zone for total time with any pressure information associated with the touches, such pressure sensed at the stylus and communicated wirelessly to the information handling system or pressure detected directly by the display. Again, touches at a folding region of the flexible display have a different modification effect than touches where the POLED material has a more substantial or fixed backing support, and the state of the fold at the time of the touch may have different impacts. Similarly, fold state impacts constraints set for a folding area, such as where a folded state of POLED material may have a greater degradation effect responsive to a touch than a planar state. In one example embodiment, touches are tracked based upon a detected pressure, a detected touch time, a type of touch (i.e., stylus, type of stylus tip, finger, bulk item like a cup, etc. . . . ), and a pressure of the touch. In another example embodiment, POLED material touches may be aggregated, such as by total number of touches with each touch assigned a number based upon its duration and pressure. Similarly, touches may be aggregated to time value, such as by tracking touch time with a multiplier applied based upon the pressure applied at the touch. Another example is tracking average stylus pressure applied to each zone. If a stylus includes a distance detector, such as an IR TOF detection device, waviness of the flexible display film is detected and tracked based upon distance data provided from the stylus. The number of folds of the flexible display film, the amount of each fold, the total duration of the folds and the time since the last change in a fold state are each derived from rotational orientations sensed by the rotational orientation sensor.

In various embodiments, POLED material degradation will impact various operating constraints. For instance, a maximum stylus pressure decreases over time based upon application of the operating conditions tracked above. An initial maximum pressure is set at manufacture, such as based upon testing of a new POLED material. As the POLED material degrades over time, the maximum pressure decreases so that an end user may be warned if touch inputs risk damage to the POLED material, such as may happen in a fold region having degradation due to folding and experiencing current operating conditions of high temperature. As another example, POLED material degradation may result in initiation of color compensation for one of the plural regions based upon its operating conditions independent of the flexible display film as a whole. This limited color compensation to within just one of plural flexible display regions takes a relatively small time compared with a complete color compensation across the whole flexible display film. From a system perspective, POLED material degradation offers opportunities to manage system operations so that POLED material life is extended. For instance, user interfaces may be shifted to selected portions of the flexible display film so that bright images or images associated with greater degradation are presented at display zones having less degradation. Similarly, zones having greater available maximum pressures may have user interfaces presented for stylus touches while zones having lower maximum pressures may have user interfaces presented that are not associated with touches.

Figure 9A:
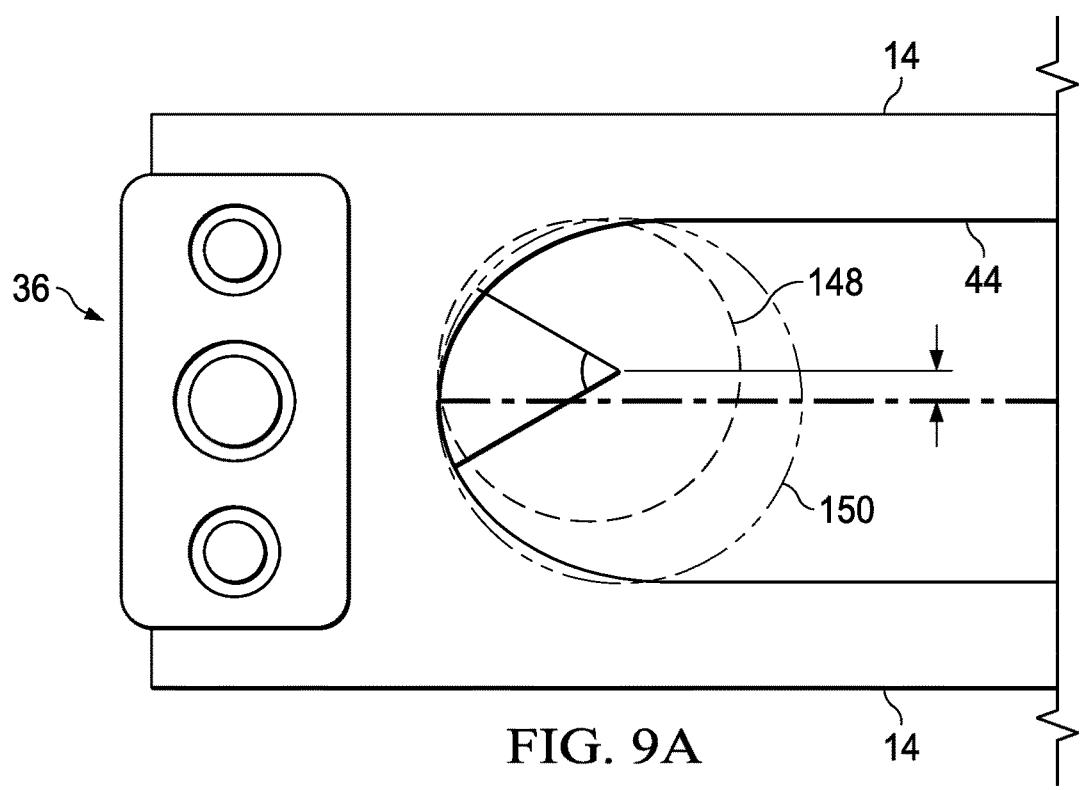
FIGS. 9A and 9B depict an example of flexible display film fold radius changes related to time in a folded position.
Figure 9B:
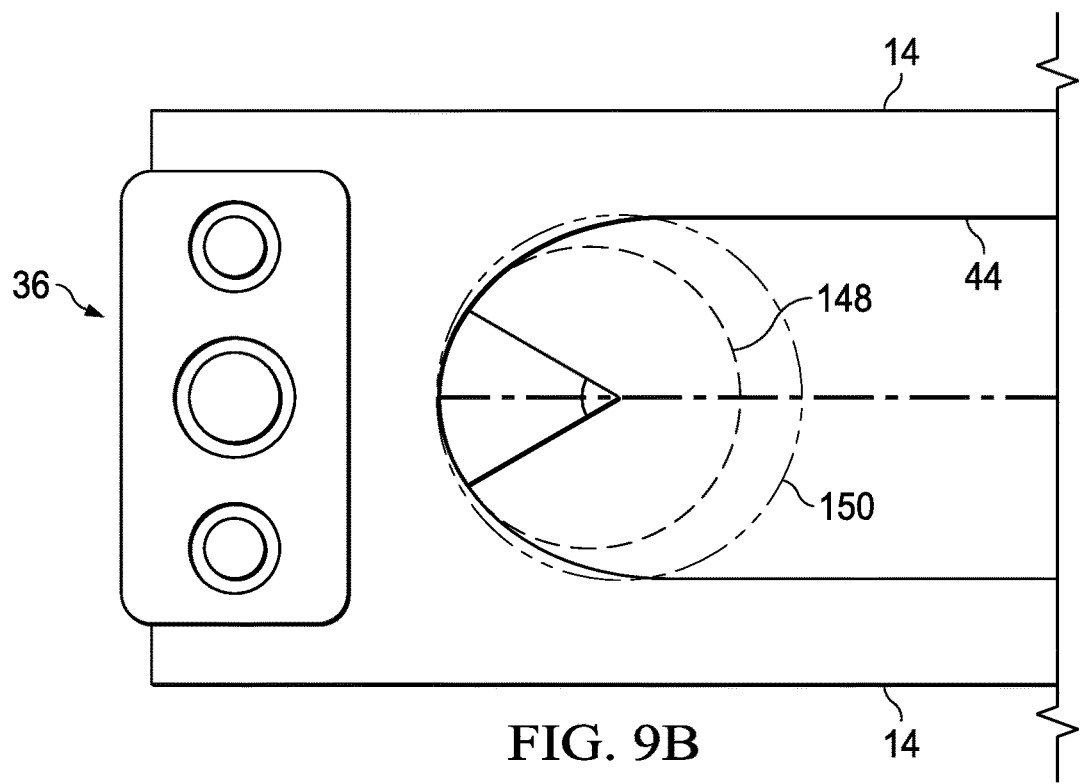

Once POLED material is characterized and its degradation modeled to define modified operating constraints, the modified operating constraints are applied to protect the POLED material of the flexible display film from non-ideal operating conditions. Some examples of non-ideal operating conditions include high or low temperatures or an extended time period, such as 24 hours, in a folded state. For instance, as is illustrated by FIGS. 9A and 9B, extended time periods in the folded orientation may result in compression of the fold radius with related stress on the POLED material, especially if the rotation to remove the fold is attempted at high or low temperatures. One example of a protective action based upon sensed operating conditions is a magnetic latch that pushes housing portions apart if a folded state is maintained for a predetermined time period, such as time determined from temperature and POLED material degradation information. By pushing the housings apart, such as with aligned like polarity, the radius of the POLED material is increased, which decreases the impact of the folded state on the POLED material. Another example of a protective action is a hinge brake that prevents changes to the folded state of the POLED material if currently sensed conditions exceed predetermined thresholds, such as a high or low temperature threshold determined in part from POLED degradation. For instance, a hinge brake engages the hinge, such as by binding hinge gears or increase friction torque that resists hinge rotation, until heating and/or cooling elements bring POLED material to a thermal state that will allow folding/unfolding. In one example embodiment, an end user may select from a user interface active thermal management of POLED material while the information handling system is in the folded state so that the end user will not experience delays by the hinge brake from changing the fold position, such as when the information handling system is in an off state. Notification to the end user of a delay caused by the hinge brake may be provided with an LED or speaker disposed in the housing, such as by sounding an alarm if an attempt to change the fold state will violate POLED material operating constraints. As described above, thermal conditions at a particular flexible display film zone may be adjusted with active heating or cooling or by adjusting operating conditions of a processing component near the zone.

Figure 6:
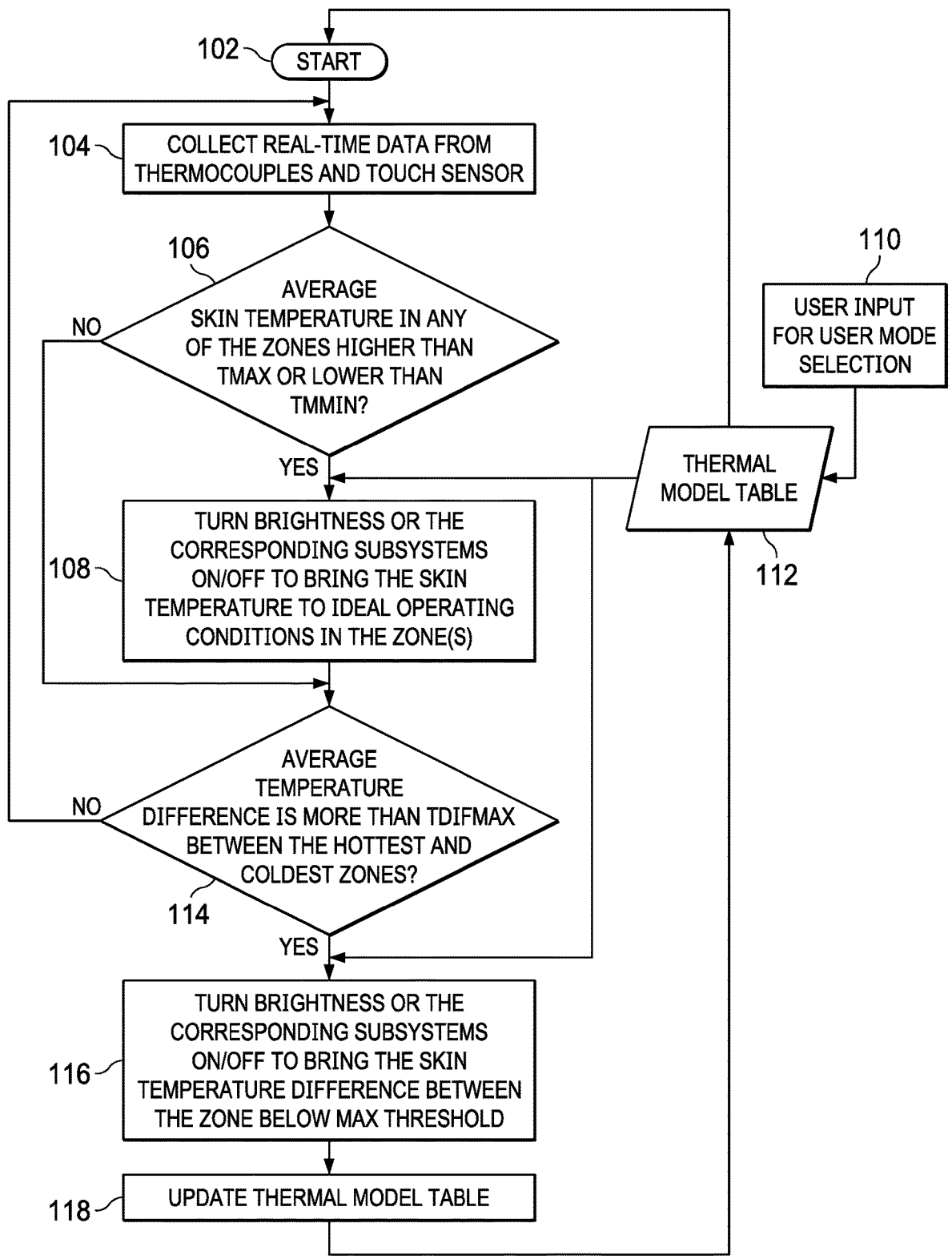
FIG. 6 depicts a flow diagram of a process for monitoring and adapting a flexible display film operation based upon thermal operating conditions and constraints.

Referring now to FIG. 6, a flow diagram depicts a process for monitoring and adapting a flexible display film operation based upon thermal operating conditions and constraints. The process starts at step 102 and continues to step 104 to collect real time operating conditions for the flexible display film, such as thermal sensor output, touch detection output, and virtual sensor output derived from power consumption. At step 106, a determination is made of whether the average skin temperature of any zone of the flexible display is higher than the maximum or minimum temperature constraint set for that zone. If a temperature constraint is violated, then the process continues to step 108 to take corrective actions. Note that corrective actions are determined in part upon end user configuration settings, which are indicated at 110 and a thermal model table indicated at 112. User inputs to change configurations made at 110 are applied to generate the thermal model table at 112 to define the thermal-related limits for acceptable operating conditions. These user settings and the resulting thermal model table may adjust as needed to ensure operations within safe constraints that protect the system from damage, such as with adjustments as POLED material deteriorates over time at different rates based upon detected operating conditions. In the example embodiment, the corrective action involves adjusting brightness and subsystem operations to adjust thermal conditions near the display portion so that the display portion temperature returns to within the operating constraint range. For instance, if thermal conditions are too high, brightness is decreased in the region and nearby processing components are throttled; if thermal conditions are too low, brightness is increased in the regions and nearby processing components execute non-productive code to increase their thermal output. At step 114, a determination is made of whether the average temperature difference is greater than a maximum temperature difference constraint between the zones that have the highest and lowest temperatures. In one alternative embodiment, a similar comparison may be made for all display zones relative to their adjacent display zones so that a temperature difference in a particular area of the flexible display does not exceed a threshold. If the temperature difference falls within constraints, the process returns to step 104 to continue monitoring the flexible display film thermal state. If at step 114 the temperature difference exceeds the operating constraint threshold, the process continues to step 116, based upon the user configuration at step 110 and the thermal model at step 112, to take corrective action to bring the temperature difference to within operating constraints, such as by altering brightness and processing component operations. From step 116, the process continues to step 118 to update the thermal model table at step 112, and returns to step 102 to initiate monitoring of operating conditions based upon the updated thermal model.

Figure 7:
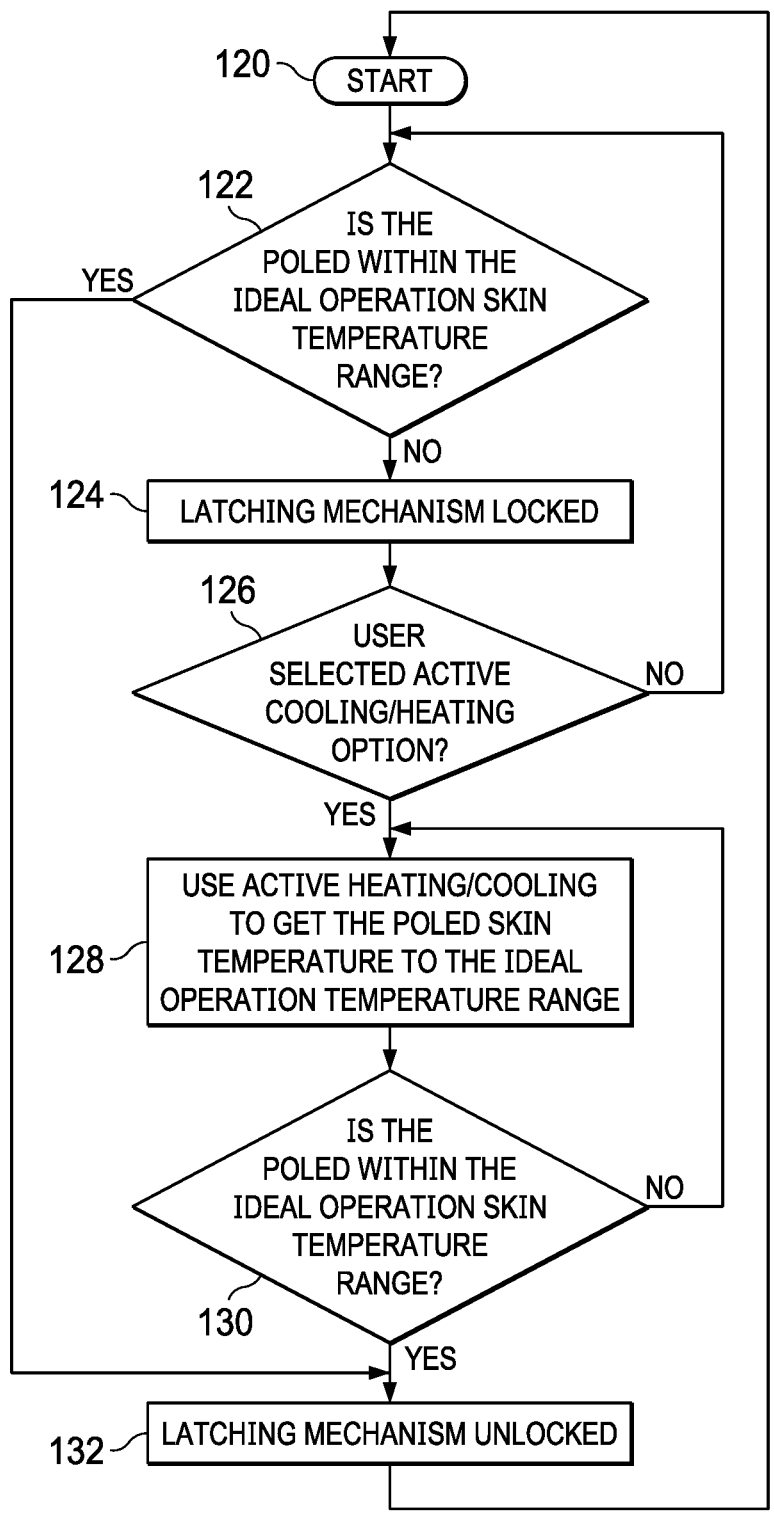
FIG. 7 depicts a flow diagram of a process for adapting information handling system operating conditions in response to detection of non-ideal thermal conditions.

Referring now to FIG. 7, a flow diagram depicts a process for adapting information handling system operating conditions in response to detection of non-ideal thermal conditions. The process starts at step 120 and continues to step 122 to determine if the POLED material falls within thermal constraints that suggest folding/unfolding of the flexible display film may be performed without damage to the POLED material. In one embodiment, the process starts in response to generation of an interrupt at a GPIO by a detection of a rotation attempt at the hinge, such as to initiate a determination of the flexible display film thermal state before rotation of the hinge is allowed. If thermal conditions of the POLED material falls within thermal constraints that allow folding/unfolding, the process continues to step 132 to release the hinge and allow rotation of the hinge. In one embodiment, the release of the hinge may be with a torque to resist rotation that varies based upon the flexible display film thermal state, such as to reduce folding/unfolding motion speed if thermal conditions are near a constraint.

If at step 122 thermal conditions violate a thermal constraint related to hinge rotation, the process continues to step 124 to ensure that the hinge brake locks the hinge to restrict hinge rotation. The process then continues to step 126 to determine if the end user has configured active heating and/or cooling to adjust the flexible display thermal state. If active heating and/or cooling is not enabled, the process returns to step 122 to continue monitoring the flexible display film thermal state. If active heating and/or cooling are activated, the process continues to step 128 to use the active heating and/or cooling to get the POLED material to a thermal state that is conducive to folding/unfolding without damage. At step 130 a determination is made of whether the POLED material thermal state falls within thermal constraints for folding/unfolding. If the thermal constraints are not met, the process returns to step 128 to continue monitoring the thermal state response to the thermal heating/cooling. Once the flexible display film POLED material falls within the thermal constraints to allow folding/unfolding, the process continues to step 132 to release the hinge and then to step 120 to continue monitoring the POLED material thermal state relative to folding/unfolding thermal constraints.

Figure 8:
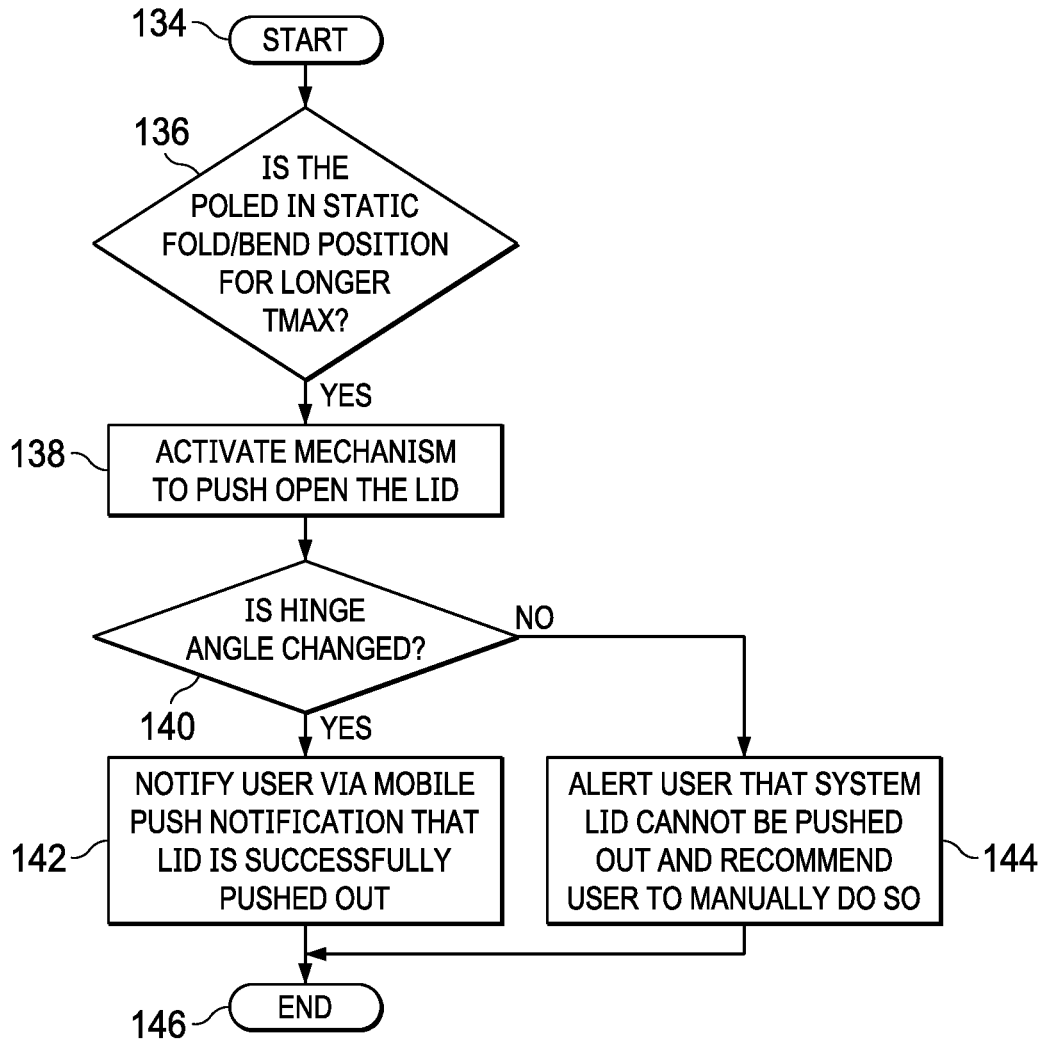
FIG. 8 depicts a flow diagram of a process for adapting information handling system operating conditions based upon time in a folded position.

Referring now to FIG. 8, a flow diagram depicts a process for adapting information handling system operating conditions based upon time in a folded position. The process begins at step 134 and continues to step 136 to determine whether the flexible display film POLED material has been in a predetermined fold state for a predetermined time constraint. The time may be based upon thermal conditions, POLED material degradation, and the amount of fold involved. If the folded position time constraint has been exceeded, the process continues to step 138 to activate a mechanism that applies some separation between the housing portions in the folded position. For instance, like magnetic polarities are aligned that create a separation force between the housing portions, thus slightly unfolding the flexible display film. At step 140, a determination is made of whether activation to separate the housing portions resulted in some unfolding of the flexible display film. If some unfolding is accomplished, then at step 142 a notification is pushed to the end user of the information handling system regarding the fold state of the flexible display. If unfolding is not accomplished, then at step 144 an alert notification is provided to the end user regarding the fold state of the flexible display film and suggesting end user intervention to release some of the fold by separating the housing portions from the fully closed position. The process ends at step 146.

Referring now to FIGS. 9A and 9B, an example side view of an information handling system depicts flexible display film fold radius changes related to time in a folded position. FIG. 9A depicts a comparison of an actual fold radius 148 of a flexible touchscreen display 44 having a flexible display film of POLED material and an ideal radius 150. The ideal radius is determined from the POLED material's folding characteristics to provide folding without excess distortion forces that can degrade the POLED material. In FIG. 9A, upon initial folding of flexible touchscreen display 44 a radius of 2.406 is achieved versus an ideal radius of 3.011 for a ratio of 79.9%. After 24 hours in the folded configuration, the real radius adjusts to 2.562 versus an ideal radius of 3.030 for a ratio of 84.6%. Forcing the housing portions apart slightly after an extended time period in a folded configuration helps to avoid compression of the POLED material that can result in damage to the flexible display film.

Figure 10C:
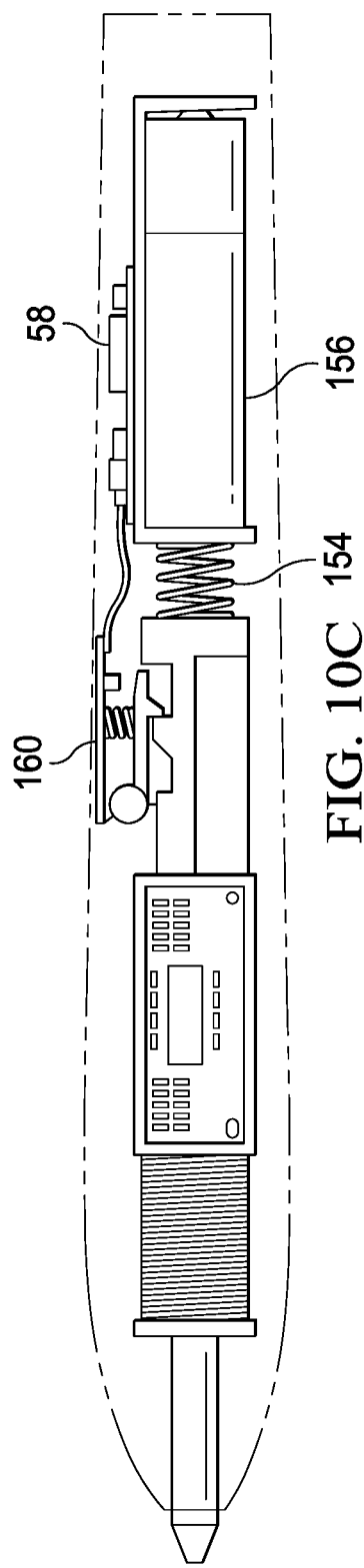
Figure 10D:
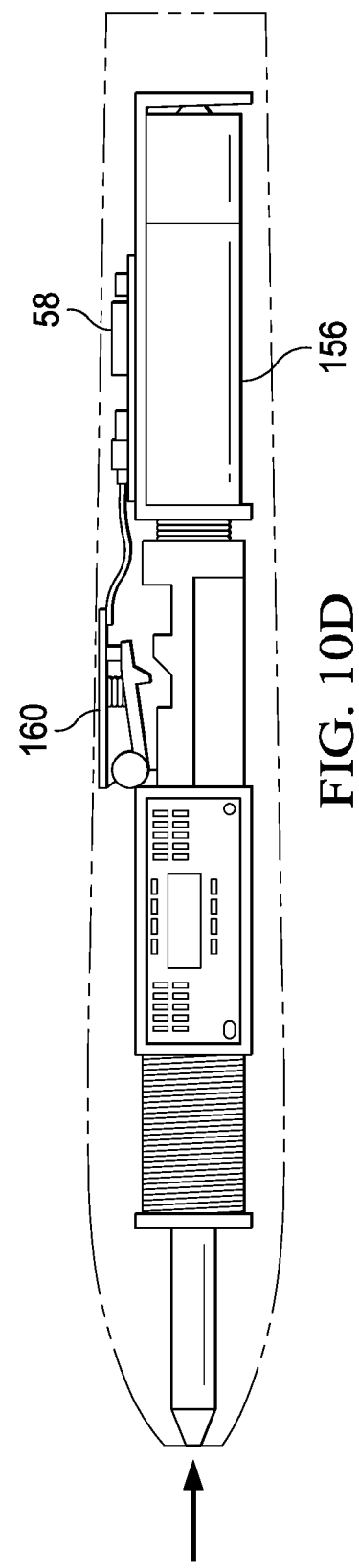

Referring now to FIGS. 10A, 10B, 10C and 10D, side cutaway views depict a stylus 52 having automated interactions with a flexible display film. In the example embodiment depicted by FIGS. 10A and 10B, a tip extends from tip assembly 56 out of stylus housing 54 through an end of the stylus housing 54. Tip assembly 56 position is controlled with an actuator 152 of shape memory alloy (SMA), sometimes referred to as muscle wire, such as nickel titanium or Nitonol, which changes crystalline form when heated. A return spring 154 biases writing tip assembly 56 to extend outward. Stylus processor 58 applies current from a battery 156 to actuator 152 so that heat generated by the current changes the crystalline form of the SMA wire causing it to rotate (as shown by arrow 158) and retract tip assembly 56 as depicted by FIG. 10B. With tip assembly 56 retracted, stylus 52 may still be used to make inputs at a display touchscreen surface where the rounded stylus housing 54 end has a larger surface area that distributes pressure from a touch across a greater surface area of the display than does the extended tip. Thus, for instance, stylus processor 58 may retract the extended tip if a pressure constraint is approached at the flexible display film so that the rounded housing end allows stylus use with greater distribution of touch pressures. In the example embodiment depicted by FIGS. 10C and 10D depict an alternative embodiment in which a latch 160 engages with the writing tip assembly to hold the writing tip in an extended position or a retracted position. In FIG. 10C, return spring 154 biases latch 160 to hold the tip extended. Stylus processor 58 activates an electromagnet of latch 160 to retract the latch and allow the tip to retract. In one embodiment, latch 160 is activated to retract the writing tip from the extended position if a pressure sensor monitor pressure working against the tip detects a pressure in excess of a flexible display touch constraint.

Figure 11A:
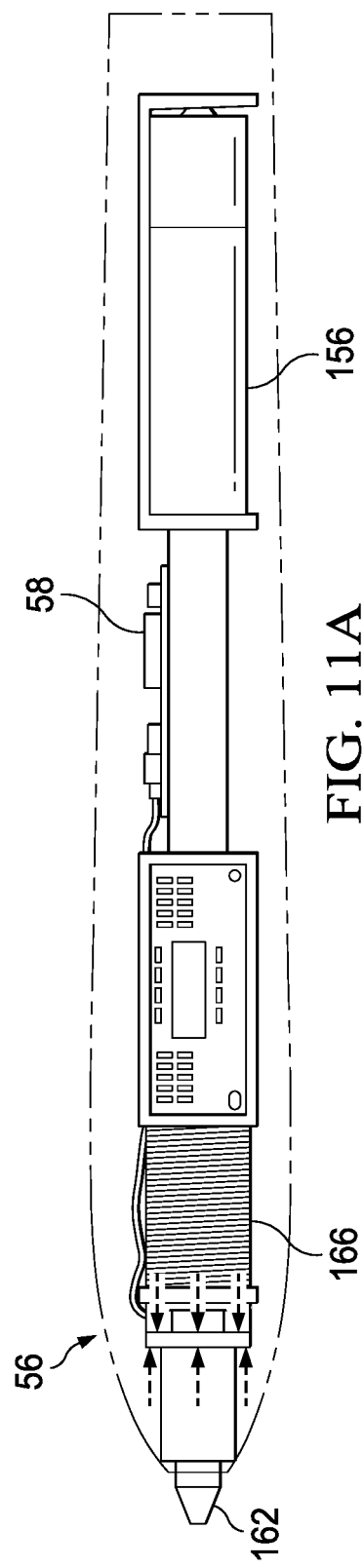
FIGS. 11A and 11B depict side cutaway views of the stylus having an extended tip configured to selectively extend.
Figure 11B:
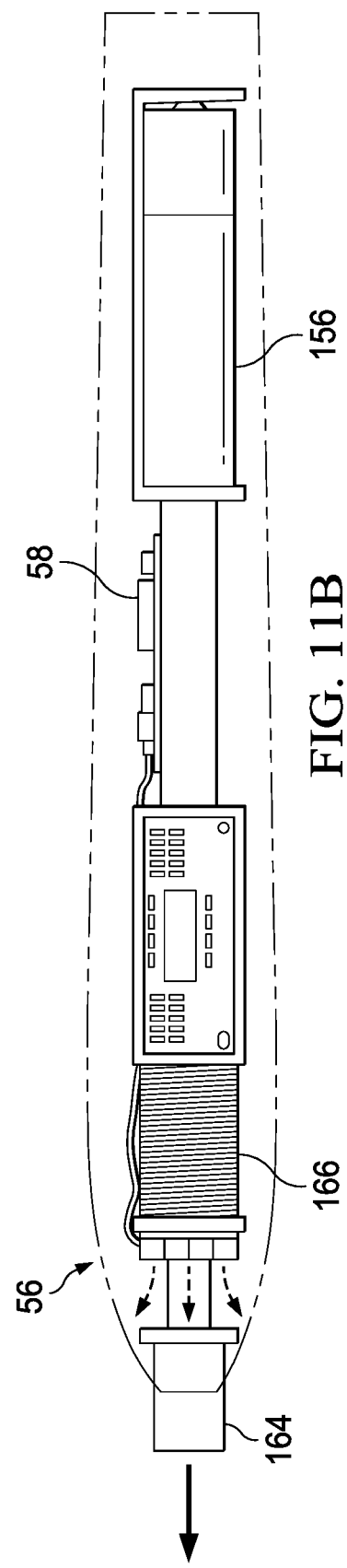

Referring now to FIGS. 11A and 11B, side cutaway views depict the stylus 52 having an extended tip 164 configured to selectively extend past a precision tip 162. In the example embodiment, an electro-permanent magnet coil 166 adapts its polarity to retract an extended tip area 164 as shown in FIG. 11A and extend the extended tip area 164 as shown in FIG. 11B. Expanded tip area 164 has a wider touch footprint that spreads touch pressures across a flexible display film than precision tip 162. In one embodiment, a pressure sensor interfaced with stylus processor 58 senses pressure in excess of a pressure constraint and, in response, stylus processor 58 changes the polarity of electro-permanent magnet 166 to extend expanded tip area 164 and maintain pressure at the flexible touchscreen display within a defined constraint.

Figure 12:
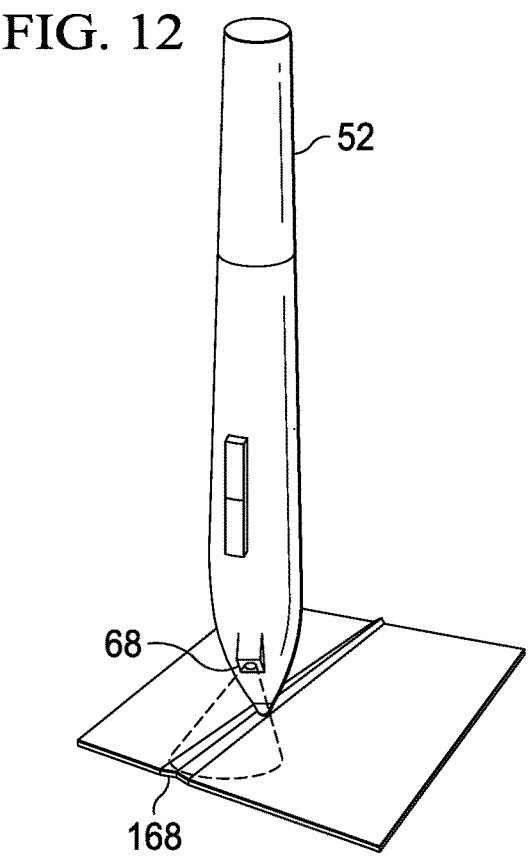
FIG. 12 depicts a side perspective view of monitoring of flexible display film surface planarity by measuring a distance with a distance sensor.
Figure 13:
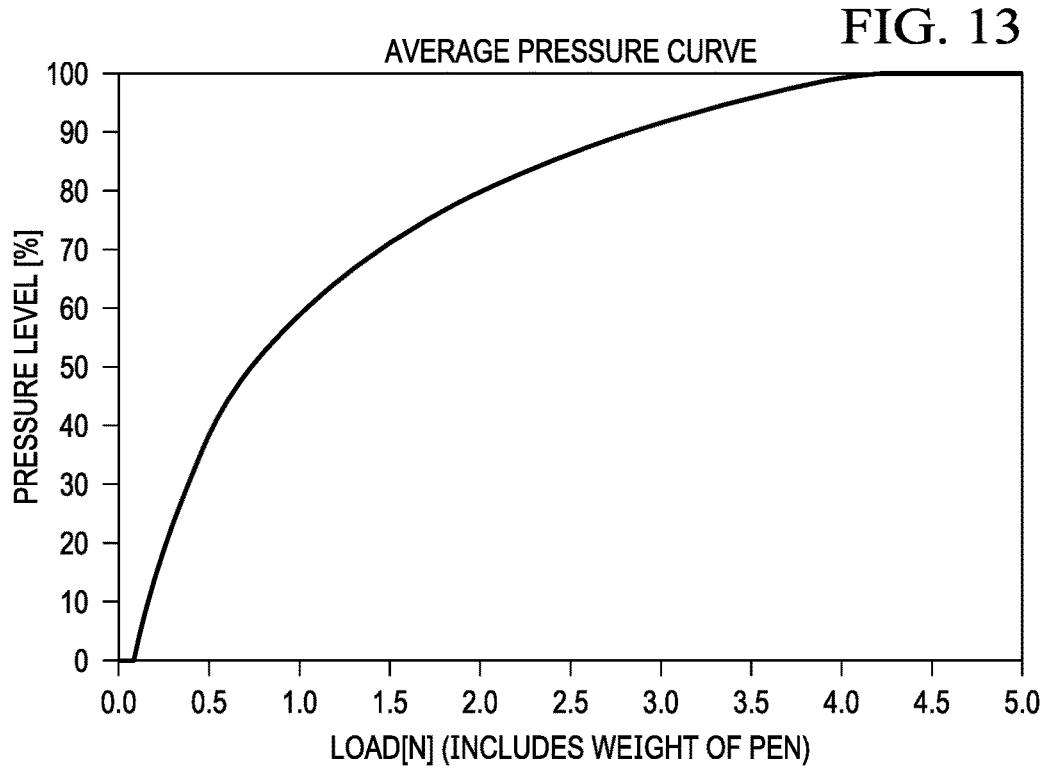
FIG. 13 depicts an example of a relationship between pressures detected at a stylus tip and load placed on the flexible display.

Referring now to FIG. 12, a side perspective view depicts monitoring of flexible display film surface planarity by measuring a distance with a distance sensor 68. As stylus 52 touches the touchscreen display surface, any deformations, such as a surface wave 168 caused by distortions in the plastic substrate, are detected by variations in the distance of the stylus to the touchscreen display as the stylus moves along the plane of the touchscreen display. Stylus 52 communicates the changes in distance to the information handling system, which relates the distances to touch positions at the touchscreen display. Detected deformations may be tracked as POLED degradations and compensated for, such as by narrow the temperature constraints in which the flexible display film is allowed to fold. Referring now to FIG. 13, an example of a relationship between pressures detected at a stylus tip and load placed on the flexible display is depicted. Such a relationship may be applied by a display manager of an information handling system so that a stylus interacting with the information handling system has pressure constraints that correlate to pressures sensed by the integrated pressure sensor. In addition to retracting a sharp tip at a pressure constraint to reduce load through an expanded tip, stylus 52 may provide a haptic or LED warning when a pressure constraint is met. In one alternative embodiment, stylus 52 sends pressure readings to the information handling system, which commands a tip retraction if a pressure constraint is met. Alternatively, the information handling system updates the pressure constraint applied by stylus 52 based upon the zone in which the stylus is detected and the type of touch detected, such as a small area of an active stylus tip or a larger area of an expanded tip.

Figure 14:
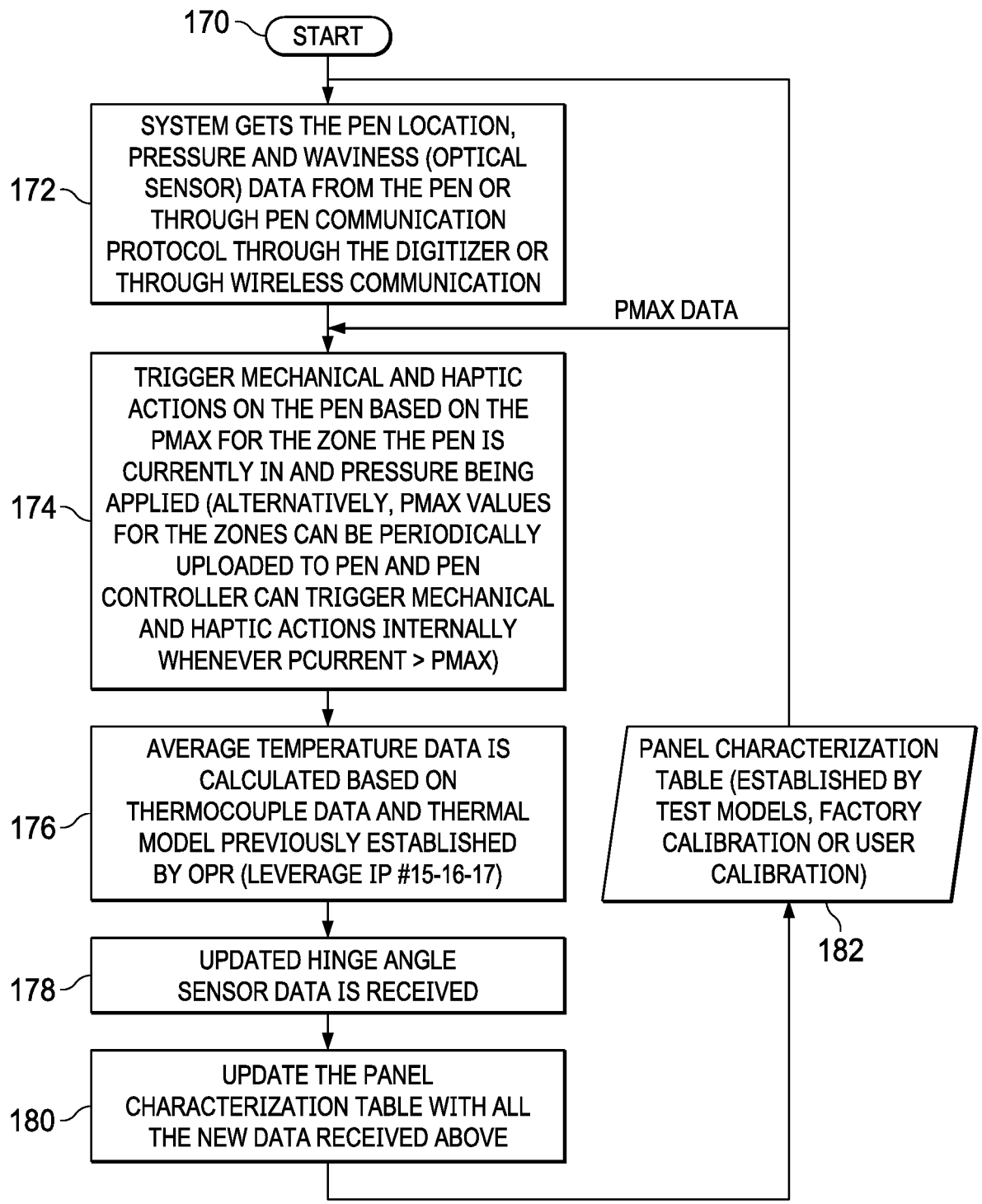
FIG. 14 depicts a flow diagram of a process for managing a stylus tip engagement at a flexible display film.

Referring now to FIG. 14, a flow diagram depicts a process for managing a stylus tip engagement at a flexible display film. The process starts at step 170, such as with detection of stylus pen use. At step 172 the information handling system gets the stylus location, pressure and waviness information from the stylus, such as through wireless communication by Bluetooth, or, if available, a stylus communication protocol that leverages the stylus active capacitance tip. At step 174, the stylus writing tip is adjusted to operate within the maximum pressure constraint of the flexible display film at the stylus touch location. For example, tip retraction and haptic warning at the stylus may be initiated with logic executing on the stylus based upon a maximum pressure communicated to the stylus and actual pressure detected at the stylus. Alternatively, pressure readings are provided from the stylus to the information handling system for comparison with pressure constraints and a command by the information handling system to adjust the stylus writing tip based upon the pressure constraints. At step 176, temperature sensor measurements along with other flexible display film operating conditions, such as OPR and brightness are taken and stored. At step 178 a hinge orientation measurement is taken and stored. At step 180, the flexible display film operating conditions, including thermal state information and hinge rotational orientation, are applied at the panel characterization table to determine updated operating constraints, including pressure constraints. The process then returns to step 170 to continue monitoring stylus operation. At 182, the panel characterization table is stored as adjusted with the sensed operating conditions and updated pressure constraints so that monitoring of the pressure constraint at step 170 uses an updated value. For instance, a non-transitory memory, such as a flash memory accessible by an embedded controller or processor ISH, stores panel characterization values and constraints for access by the system as needed.

Although the present invention has been described in detail, it should be understood that various changes, substitutions and alterations can be made hereto without departing from the spirit and scope of the invention as defined by the appended claims.

What is claimed is:

1. An information handling system comprising:
   first and second housing portions;
   a hinge rotationally coupling the first and second housing portions to rotate between closed and open positions;
   a display disposed over the first and second housing portions and the hinge, the display having a flat configuration in the open position and a folded configuration in the closed position;
   one or more thermal sensors operable to detect a thermal state at the display;
   a hinge brake interfaced with the hinge and operable to selectively lock the hinge to restrict rotation of the first and second housing portions;
   a hinge manager interfaced with the one or more thermal sensors and the hinge brake, the hinge manager operable to apply the hinge brake to restrict rotation of the first and second housing portions if the one or more thermal sensors detect a predetermined thermal state; and
   a heating element disposed proximate the display and operable to direct thermal energy towards the display;
   wherein the hinge manager applies the heating element to heat the display when the hinge brake restricts rotation due to a low thermal state.

2. The information handling system of claim 1 further comprising:
   a hinge position timer operable to track an amount of time that the hinge has a rotational orientation;
   wherein the predetermined thermal state varies based upon the amount of time.

3. The information handling system of claim 1 further comprising:
   a cooling element disposed proximate the display and operable to draw thermal energy from the display;
   wherein the hinge manager applies the cooling element to cool the display when the hinge brake restricts rotation due to a high thermal state.

4. The information handling system of claim 3 wherein the hinge manager operates on an embedded processor to maintain the display temperature in a range during both power down states and power up states of the information handling system.

5. The information handling system of claim 3 wherein the hinge manager includes an active manager interfaced with the heating element and the cooling element, the active manager selectively engage to prevent a predetermined thermal state that engages the hinge brake to prevent rotation of the first and second housing portions.

6. The information handling system of claim 1 further comprising:
   a first magnet disposed in the first housing portion; and
   a second magnet disposed in the second housing portion;
   wherein the hinge manager selectively aligns opposing polarities of the first and second magnets when the first and second housing portions have the closed position for a predetermined time.

7. The information handling system of claim 1 wherein:
   the hinge brake provides a variable torque at the hinge; and
   the hinge manager commands a variable torque based upon the predetermined thermal state.

8. The information handling system of claim 1 wherein:
   the display comprises a plastic organic light emitting diode display film;
   the hinge manager comprises an embedded controller interfaced with a central processing unit; and
   the hinge manager commands the central processing unit to execute heat generating code to direct thermal energy at the display.

9. A method for managing information handling system rotational orientation, the method comprising:
   monitoring thermal conditions associated with a display integrated in the information handling system to detect a thermal state;
   in response to a first predetermined thermal state detected by the monitoring, restricting changes to the rotational orientation;
   in response to the restricting changes to the rotational orientation, generating heat proximate the display;
   in response to the generating heat, monitoring for a second predetermined thermal state; and
   in response to the second predetermined thermal state, ceasing the restricting changes to the rotational orientation.

10. The method of claim 9 wherein the generating heat proximate the display further comprises executing a heat generating code on a central processing unit of the information handling system.

11. The method of claim 9 wherein the generating heat proximate the display further comprises applying current to a heat generation element.

12. The method of claim 9 further comprising:
in response to the restricting changes to the rotational orientation, generating a cooling airflow proximate the display to draw thermal energy from the display;
in response to the generating a cooling airflow, monitoring for a second predetermined thermal state; and
in response to the second predetermined thermal state, ceasing the restricting changes to the rotational orientation.

13. The method of claim 9 further comprising:
monitoring rotational orientation to detect a time during which the rotational orientation is maintained; and
adjusting thermal conditions associated with the display that determine the first predetermined thermal state based upon the time.

14. The method of claim 9 wherein restricting changes to the rotational orientation further comprises locking a hinge of the information handling system at the rotational orientation.

15. The method of claim 9 wherein restricting changes to the rotational orientation further comprises increasing torque applied at a hinge of the information handling system, the torque working against rotational movement.

16. A display fold management system comprising:
a hinge having a brake, the brake selectively engaged to restrict hinge rotation, the hinge having a support side that supports a flexible display in a planar position and a folded position;
one or more thermal sensors disposed to measure a thermal state of the flexible display;
a controller executing a hinge manager stored in non-transitory memory, the controller interfaced with the brake and the one or more thermal sensors, the hinge manager locking the hinge brake in response to the one or more thermal sensors detecting a first predetermined thermal state; and
a heating element operable to generate thermal energy proximate the flexible display and interfaced with the controller;
wherein the hinge manager in response to the first predetermined thermal state commands the heating element to generate thermal energy to achieve a second predetermined thermal state, the hinge manager releasing the hinge brake in response to the second predetermined state.

17. The display fold management system of claim 16 further comprising:
a cooling element operable to remove thermal energy proximate the flexible display and interfaced with the controller;
wherein the hinge manager in response to the first predetermined thermal state commands the cooling element to remove thermal energy to achieve a second predetermined thermal state, the hinge manager releasing the hinge brake in response to the second predetermined state.

* * * * *